(12) United States Patent
Lee et al.

(10) Patent No.: US 9,599,779 B2
(45) Date of Patent: Mar. 21, 2017

(54) STACKABLE OPTICAL FIBER ADAPTER

(71) Applicant: ALLIANCE FIBER OPTIC PRODUCTS, INC., New Taipei (TW)

(72) Inventors: Jhih-Ping Lee, New Taipei (TW); Wei-Cheng Lee, New Taipei (TW)

(73) Assignee: Alliance Fiber Optic Products, Inc., New Taipei (TW)

( * ) Notice: Subject to any disclaimer, the term of this patent is extended or adjusted under 35 U.S.C. 154(b) by 0 days.

(21) Appl. No.: 14/798,651

(22) Filed: Jul. 14, 2015

(65) Prior Publication Data

US 2016/0011383 A1  Jan. 14, 2016

Related U.S. Application Data

(60) Provisional application No. 61/998,933, filed on Jul. 14, 2014.

(51) Int. Cl.
*G02B 6/38* (2006.01)

(52) U.S. Cl.
CPC .......... *G02B 6/3897* (2013.01); *G02B 6/3825* (2013.01)

(58) Field of Classification Search
None
See application file for complete search history.

(56) References Cited

U.S. PATENT DOCUMENTS

| | | | |
|---|---|---|---|
| 6,908,233 B2* | 6/2005 | Nakajima | G02B 6/3807 385/53 |
| 2014/0334780 A1* | 11/2014 | Nguyen | G02B 6/3897 385/77 |
| 2015/0205060 A1* | 7/2015 | Chen | G02B 6/3869 385/89 |

FOREIGN PATENT DOCUMENTS

WO  2013179197 A1  12/2013

* cited by examiner

*Primary Examiner* — Hemang Sanghavi
(74) *Attorney, Agent, or Firm* — Dinsmore & Shohl LLP

(57) ABSTRACT

The present disclosure provides a stackable optical fiber adapter including shell members, a base with mating parts formed at front and rear sides thereof, and an accommodating cavity being transversely formed therein and communicated with the two opposite mating parts. One positioning part and wedged-jointing part are at two adjacent bases, and one clasping block and position-limiting groove are on the positioning part and the wedged-jointing part. By such a way, each two adjacent bases can be stacked, arranged or formed by a modularized manner, so that more shell members can be installed on a panel. The adapter can be easy to design the corresponding mold, the mating parts of each shell member is constant, and necessary to develop different molds, so the manufacturing process and the mold can be simplified, and the optical fiber adapter of the present disclosure can have stable structure and low cost, and further facilitate mass production.

10 Claims, 14 Drawing Sheets

STACKABLE OPTICAL FIBER ADAPTER

REFERENCE TO RELATED APPLICATIONS

This application claims the priority benefit of U.S. Provisional patent application No. 61/998,933, filed on Jul. 14, 2014.

BACKGROUND OF THE INVENTION

1. Field of the Invention

The present disclosure relates to an optical fiber adapter and more particularly, to a stackable optical fiber adapter, and each two adjacent bases of a plurality of shell members of the stackable optical fiber adapters can be vertically stacked, horizontally arranged in parallel or assembled in an array structure by a modularized manner to form as an integral assembly by cooperation between a positioning part and a wedged-jointing part, so that more shell members can be installed on the panel with higher density, and effects of stable structure, easy mass production and lower cost can be achieved.

2. Description of the Related Art

In recent years, with rapid development in communication technology and internet, data center venders and telecommunication venders make efforts in fields of high density, high transmission rate, large volume and intelligent equipment. In order to solve the requirements for higher data transmission rate, smaller occupied space and lower power consumption, cabling systems which are an important constitution of physical infrastructure are paid more attention. Electric cables and optical fiber transmission system are two basic transmission mediums in cabling system of the data center. Compared with the electric cable transmission system, the optical fiber transmission system has advantages of larger bandwidth, higher transmission rate, longer transmission distance, thinner volume, better anti-EMI and nice confidentiality, so the optical fiber transmission system will definitely become the future trend.

The optical fiber adapter is a member which is not equipped with light source and widely used in optical fiber transmission system for detachment and connection between optical fibers. Ends of the two optical fibers are precisely aligned with each other and connected through the optical fiber adapter, and the optical signal outputted from the optical fiber of the transmitter can be coupled to the optical fiber of the receiver in maximum degree. Generally, there are many types of small-sized packaged optical fiber connectors, the connector widely used in its field is SC type or LC type, and the LC type optical fiber connector has 6.25 mm of core pitch and 1.25 mm of core alignment and two LC type simplex connectors can then be assembled as a duplex connector. Therefore, the LC type optical fiber connector not only has advantages in size and precise assembly alignment, but also has flexibility in applications of simplex and duplex transmissions both.

However, the plurality of optical fiber connectors are aligned and connected with each other through the internal pipe of the optical fiber adapter. Upon actual application, the user can select the pipe made of ceramic or copper, having high precise dimension, mechanical durability, and very low insertion loss and reflection loss, so that the loss in cross connection between the optical fibers can be ensured to be very low. Please refer to FIG. 12 through FIG. 14. The traditional optical fiber adapter includes a shell member A having a uni-body or two-piece structure. The shell member A defines a plurality of accommodating cavities A1 formed therein, and sockets A10 are disposed at outer openings of the accommodating cavities A1, respectively, and an optical fiber pipe (not shown in FIGs) is transversely penetrated through a central sidewall between each two accommodating cavities A1. Wing plates A2 are respectively protruded at two opposite sides of central portion of the shell member A. When being respectively inserted into the accommodating cavities A1 of the shell member A, the connecting parts of two optical fiber connectors can be guided by the optical fiber pipe to align and connect with each other, so as to ensure nice optical signal transmission.

However, in normal condition, the standard LC type optical fiber adapter is installed on rack-mount panel, and most manufacturers make effort in installing more optical fiber adapters in limited space of the panel for meeting the requirement of entire spatial configuration and efficiently solving the problem of limited bandwidth due to insufficient transmission channels. The shell members A of the plurality of optical fiber adapters are respectively installed in the panel through the wing plates A2 to assemble a 4×4 array structure, but each two adjacent shell members A arranged in parallel are separated by widths of two wing plates A2, it causes that amount of the optical fiber adapters able to be installed on the panel with given standard size is limited and the installation density is hard to be improved, so the entire spatial configuration cannot be properly arranged for actual application.

Moreover, some manufacturers develop other traditional optical fiber adapter, as shown in FIG. 14, and the shell member A has a uni-body structure or two-piece structure and directly has multiple accommodating cavities A1 (such as six or sixteen accommodating cavities A1) formed therein, so the thickness of the wall between the two adjacent accommodating cavities A1 can be efficiently reduced, and total width of the shell member A can be shortened without changing the 6.25 mm of core pitch. However, amount of the accommodating cavities A1 of the shell member A is constant, if the user requires shell members A having different amounts of accommodating cavities A1, the manufacture must create different molds for productions, and the total manufacturing process of injection molding will become more complex and difficult as the amount of the accommodating cavities A1 becomes more, so more molds are required and cost is hard to be efficiently reduced. Therefore, designing the shell member A must consider how to properly arrange the entire spatial configuration in the limited space and reduce manufacturing cost, and these factors are also the keys for installing more optical fiber adapters with higher density, and facilitating modularization for mass production.

SUMMARY OF THE INVENTION

According to main aspect of the present disclosure, a base of a shell member defines a plurality of mating parts formed at front and rear sides thereof, and an accommodating cavity is formed in the base and transversely communicated with the two opposite mating parts for insertion of an optical fiber connector. Each two adjacent bases of the plurality of shell members define at least one positioning part and corresponding wedged-jointing part at lateral sides thereof respectively, the positioning part and the wedged-jointing part respectively have a dovetail-shaped clasping block and a position-limiting groove which can be mounted with each other. Therefore, each two adjacent bases of the plurality of shell members can be vertically stacked, horizontally arranged in parallel or formed as an integral array structure by a modularized manner, and more shell members can be installed on the panel with higher density. The assembled structure of the shell member is simple and it is easy to design such mold, each shell member has constant number of the mating parts, so it is not necessary to develop different molds for the shell members having different amount of mating parts, the manufacturing process and amount of the molds can also be simplified, and the effects of stable structure, easy assembly, easy mass production and reduced cost can be achieved.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
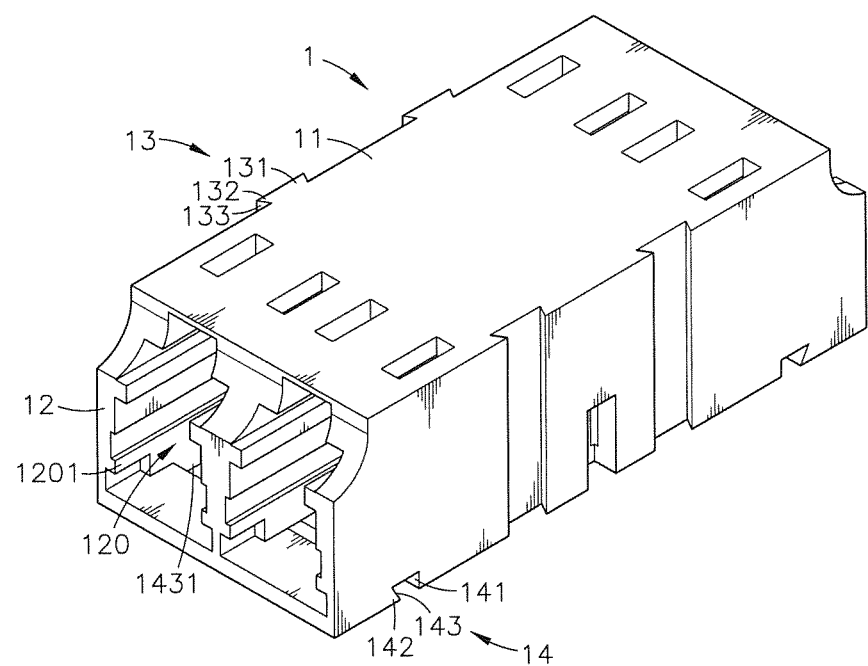
FIG. 1 is an elevational view of a preferred embodiment of the present disclosure.
Figure 2:
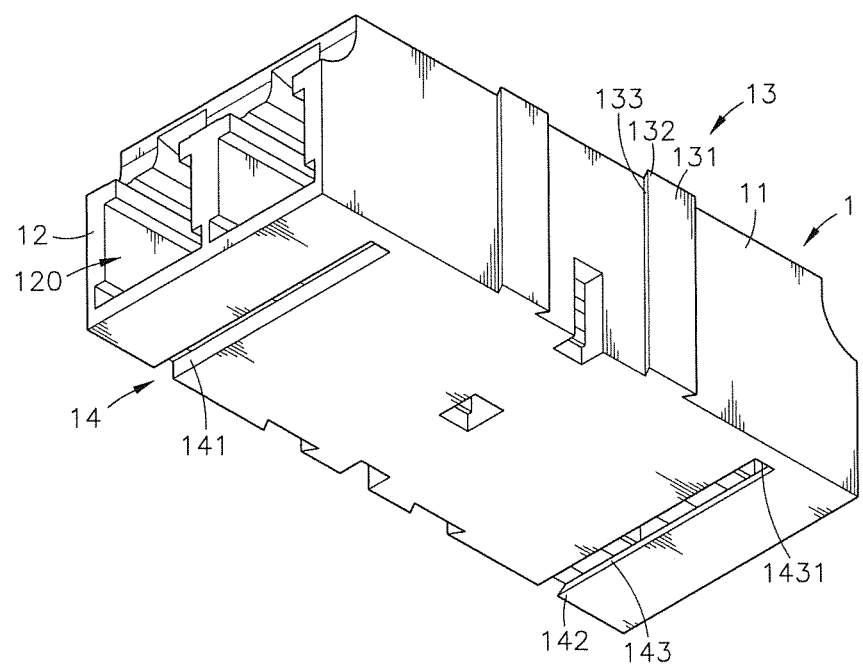
FIG. 2 is an elevational view corresponding to FIG. 1 when viewed from another angle
Figure 3:
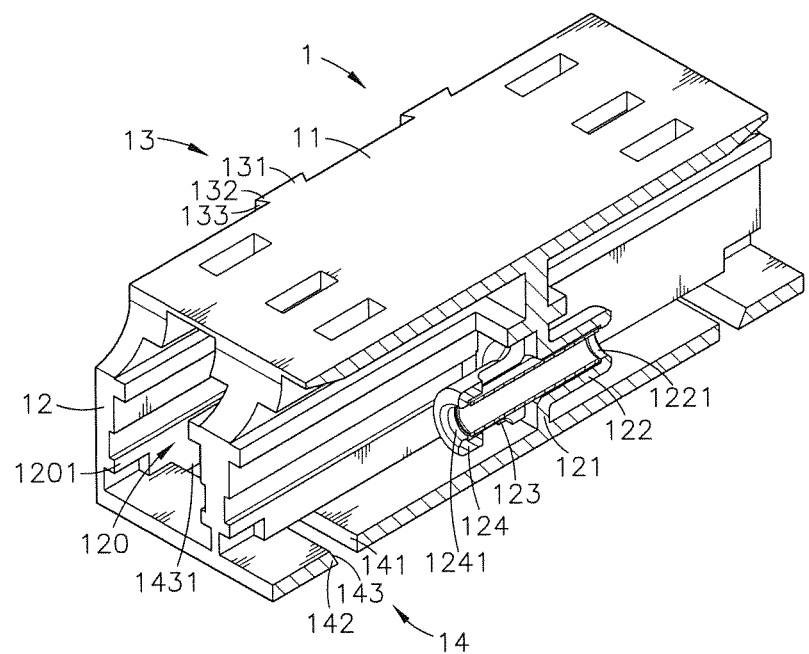
FIG. 3 is a sectional view of the preferred embodiment of the present disclosure.
Figure 4:
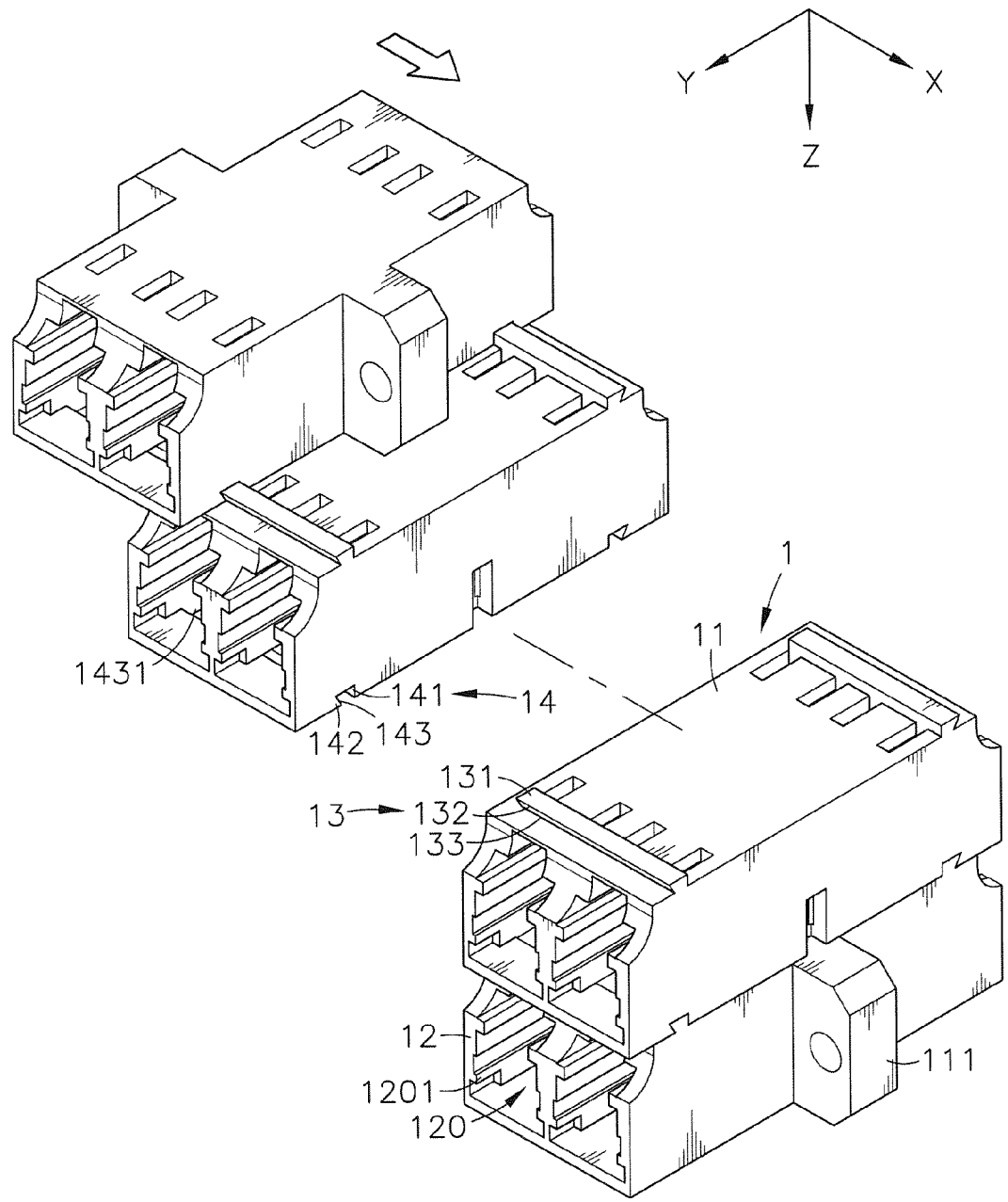
FIG. 4 is an exploded view of the preferred embodiment of the present disclosure before assembly.
Figure 5:
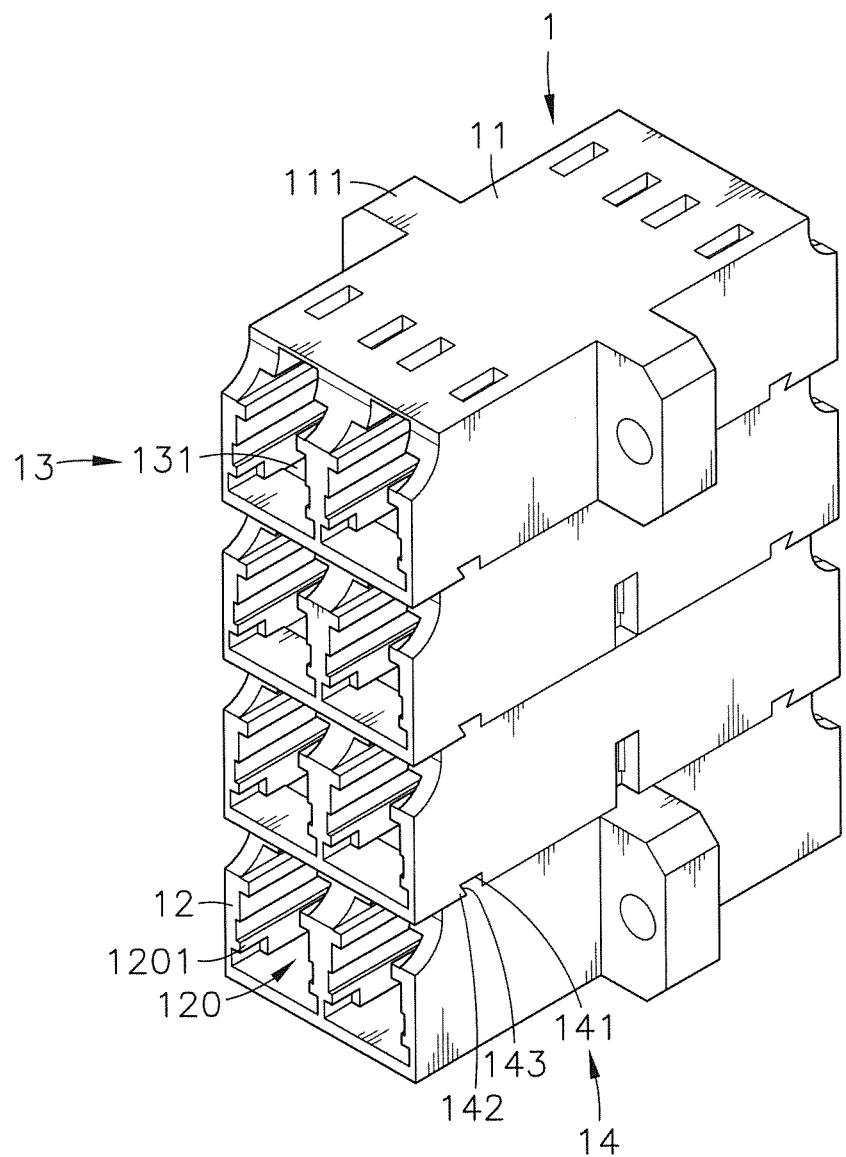
FIG. 5 is an elevational view of the preferred embodiment of the present disclosure after assembly.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 through FIG. 5 which respectively show an elevational view of a preferred embodiment of the present disclosure, an elevational view and a sectional view corresponding to FIG. 1 when viewed from another angle, an exploded view of the preferred embodiment before assembly, and an elevational view after assembly. As shown in FIGs clearly, a stackable optical fiber adapter of the present disclosure includes a plurality of shell members 1, and each shell member 1 is a rectangular base 11 having a hollow structure and the base 11 has a plurality of mating parts 12 formed at front and rear opposite sides thereof and an accommodating cavity 120 transversely communicated with two opposite mating parts 12, and sockets 1201 respectively located at front and rear parts of the accommodating cavity 120. A compartment wall 121 is respectively formed between the two accommodating cavities 120, and each compartment wall 121 defines a hollow mounting part 122 transversely extended and having an insertion channel 1221 which a pipe 123 is fastened therein. A fastening part 124 is formed from other side-wall opposite to the mounting part 122 and located at an accommodating cavity 120 of other mating part 12, and has a fastening channel 1241 transversely formed therein to receive the end of the pipe 123 projected from the compartment wall 121. According to the above-mentioned elements, an optical fiber connector matching with the LC type is constructed. There are various design manners for structure of the shell member 1, so the abovementioned structure can be changed upon actual application to construct an optical fiber connector matching with SC type, MPO type or other type.

The bases 11 of the plurality of shell members 1 can be integrally assembled with each other, and each base 11 has at least one positioning part 13 and at least one wedged-jointing part 14 respectively located at two adjacent lateral sides thereof, and the positioning part 13 and the wedged-jointing part 14 can be mounted with each other. Each positioning part 13 has a dovetail-shaped clasping block 131 protruded along a direction where the bases 11 are mounted with each other, and each clasping block 131 defines a rail 132 outwardly formed at one or two lateral sides thereof and a sliding slot 133 formed at an inner side of the rail 132 and bent inwardly. Each wedged-jointing part 14 of the shell member defines a recessed position-limiting groove 141 formed along the direction where the bases 11 are mounted with each other, and a sliding track 142 formed at one or two sidewall of the position-limiting groove 141. The sliding track 142 defines a sliding slot 143 formed at inner side thereof and inwardly bent, and a step-like stop wall 1431 is formed at a bottom opening of the sliding slot 143 and outwardly bent. Further, the base 11 defines at least one wing plate 111 protruded at one or two lateral sides of the compartment wall 121 at the center part between the two mating parts 12; however, in actual application, the wing plate 111 can be omitted upon demand or different structural design.

The preferred implementation of the present disclosure includes four shell members 1 stacked and assembled in an order from down to top, the positioning parts 13 are transversely disposed on each of top portions of bases 11 of the first, second and third shell members 1 and respectively adjacent to the sockets 1201 of the accommodating cavities 120 of front and rear mating parts 12, and the wedged-jointing parts 14 are respectively disposed on each of bottom portions of the bases 11 of the second, third and fourth shell members 1 and corresponding to the positioning parts 13. A plurality of wing plates 111 are protruded at two lateral sides of the bases 11 of the first and fourth shell members 1. According to actual application, the plurality of positioning parts 13 and the plurality of wedged-jointing parts 14 corresponding thereto can be transversely disposed on the top and bottom walls of the base 11 and adjacent to the front and rear mating parts 12 respectively, and the positioning part 13 and the wedged-jointing part 14 respectively have dovetail-shaped clasping block 131 and position-limiting groove 141; alternatively, the plurality of positioning parts 13 and the plurality of wedged-jointing parts 14 corresponding thereto can be disposed on the top wall or bottom wall of the base 11 and adjacent to the front and rear mating parts 12.

During assembly of this preferred embodiment of the present disclosure, a positioning part 13 of one shell member 1 is aligned with a wedged-jointing part 14 of other shell member 1 firstly, and the two bases 11 are pushed towards each other along an X axis to mount the clasping block 131 into other position-limiting groove 141, so the rail 132 at aside of the clasping block 131 is slid along the sliding slot 143 inside the other position-limiting groove 141, or the sliding track 142 inside the other position-limiting groove 141 is slid along the sliding slot 133 at a side of the clasping block 131. After the base 11 is inserted and fastened, an end surface of the clasping block 131 is stopped at the stop wall 1431 of other sliding slot 143 at bottom opening thereof, to facilitate the lateral sides of two adjacent bases 11 to flush with each other. By such way that the positioning part 13 of the shell member 1 mounted with the wedged-jointing part 14 of other shell member 1 along the X axis, the dovetail-shaped clasping block 131 of the positioning part 13 can be used to bear a force applied from Y axis, so as to stably fasten the two shell members 1 and prevent one shell member 1 from falling out of other shell member 1. By the manner of sequentially assembling the two adjacent base 11 to integrally form a vertical modularized stack structure, top and bottom sides of the two adjacent bases 11 are tightly abutted with each other, the number of the shell members 1 able to be installed in a predetermined height range becomes more and the density of installed shell members 1 become higher.

Figure 6:
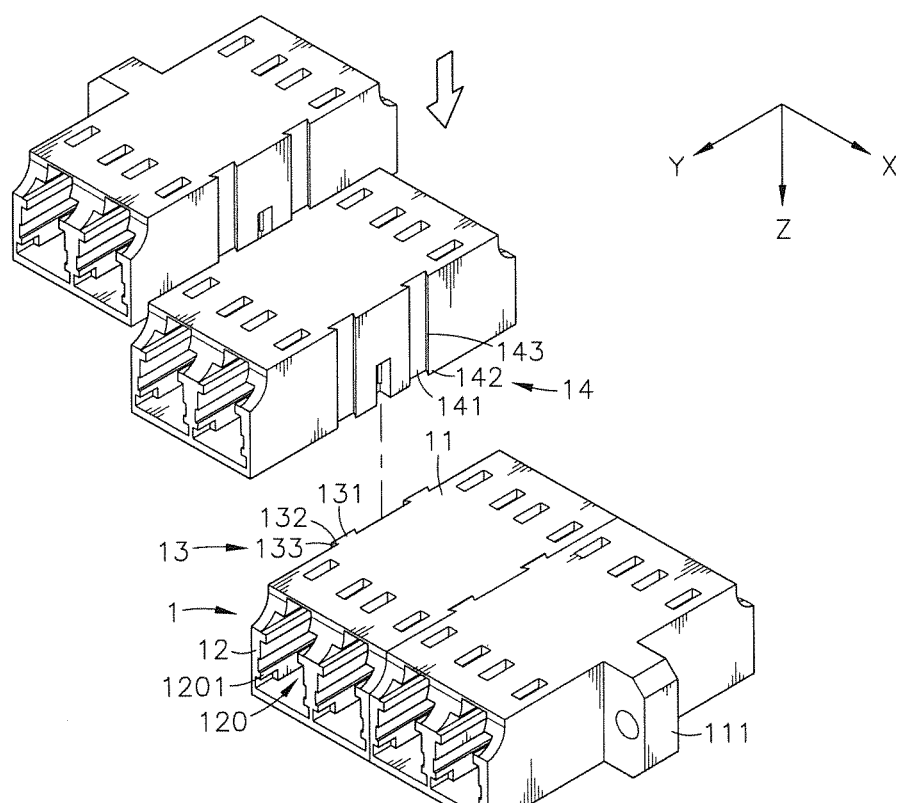
FIG. 6 is an exploded view of other preferred embodiment of the present disclosure before assembly.
Figure 7:
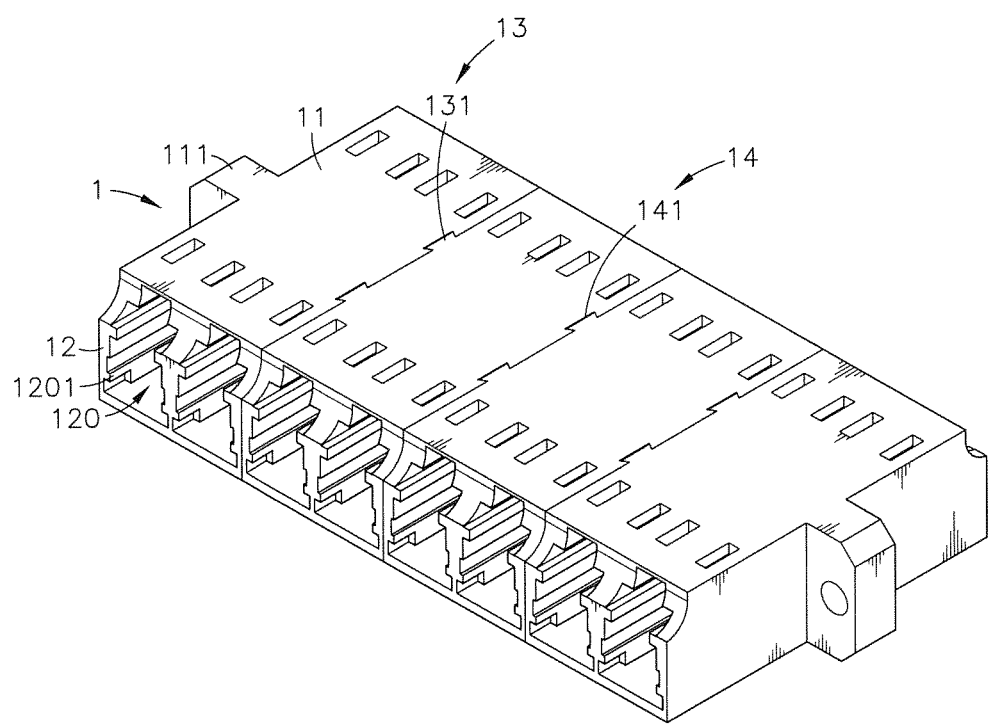
FIG. 7 is an elevational view of the other preferred embodiment of the present disclosure after assembly.
Figure 8:
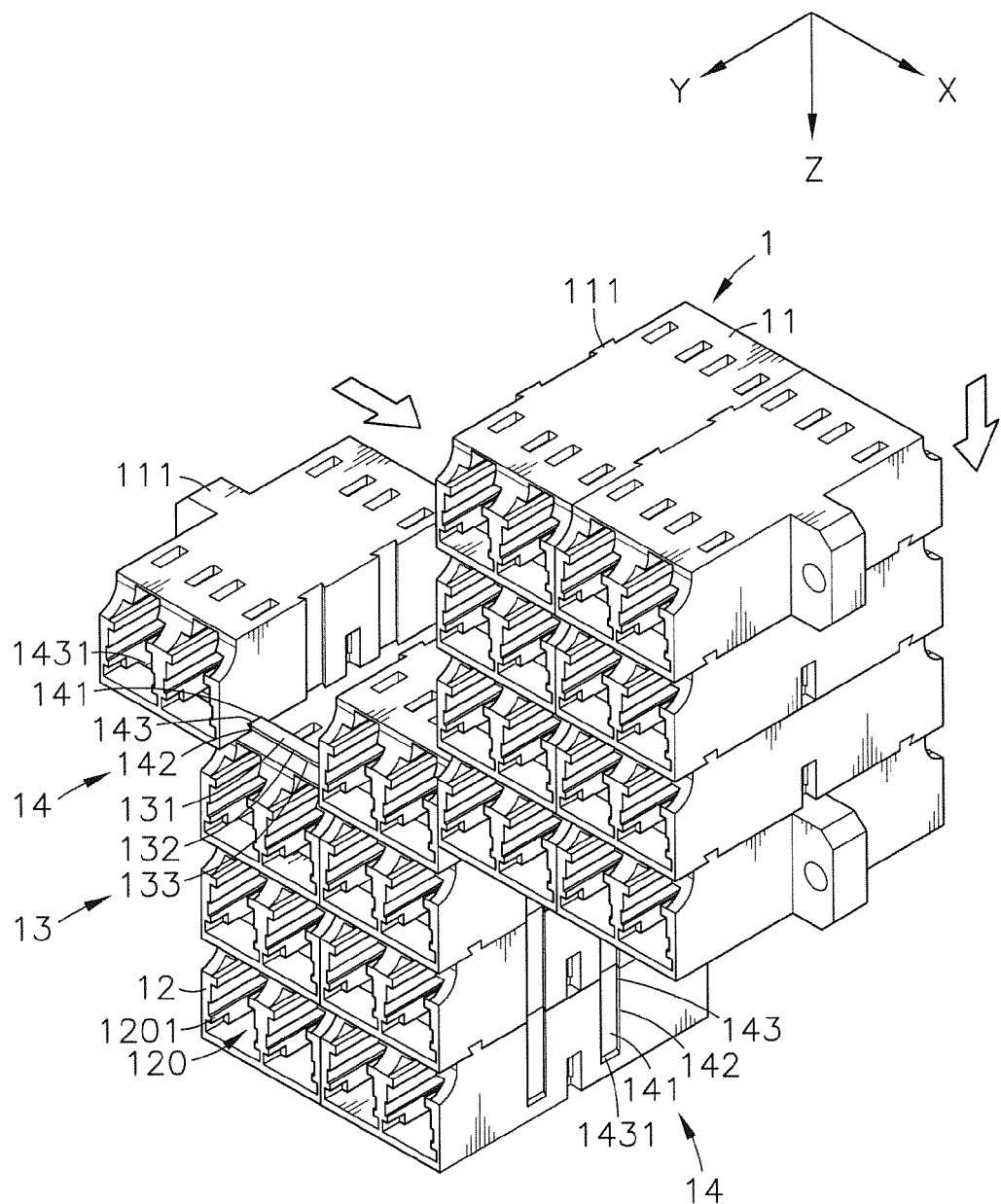
FIG. 8 is an exploded view of another preferred embodiment of the present disclosure before assembly.
Figure 9:
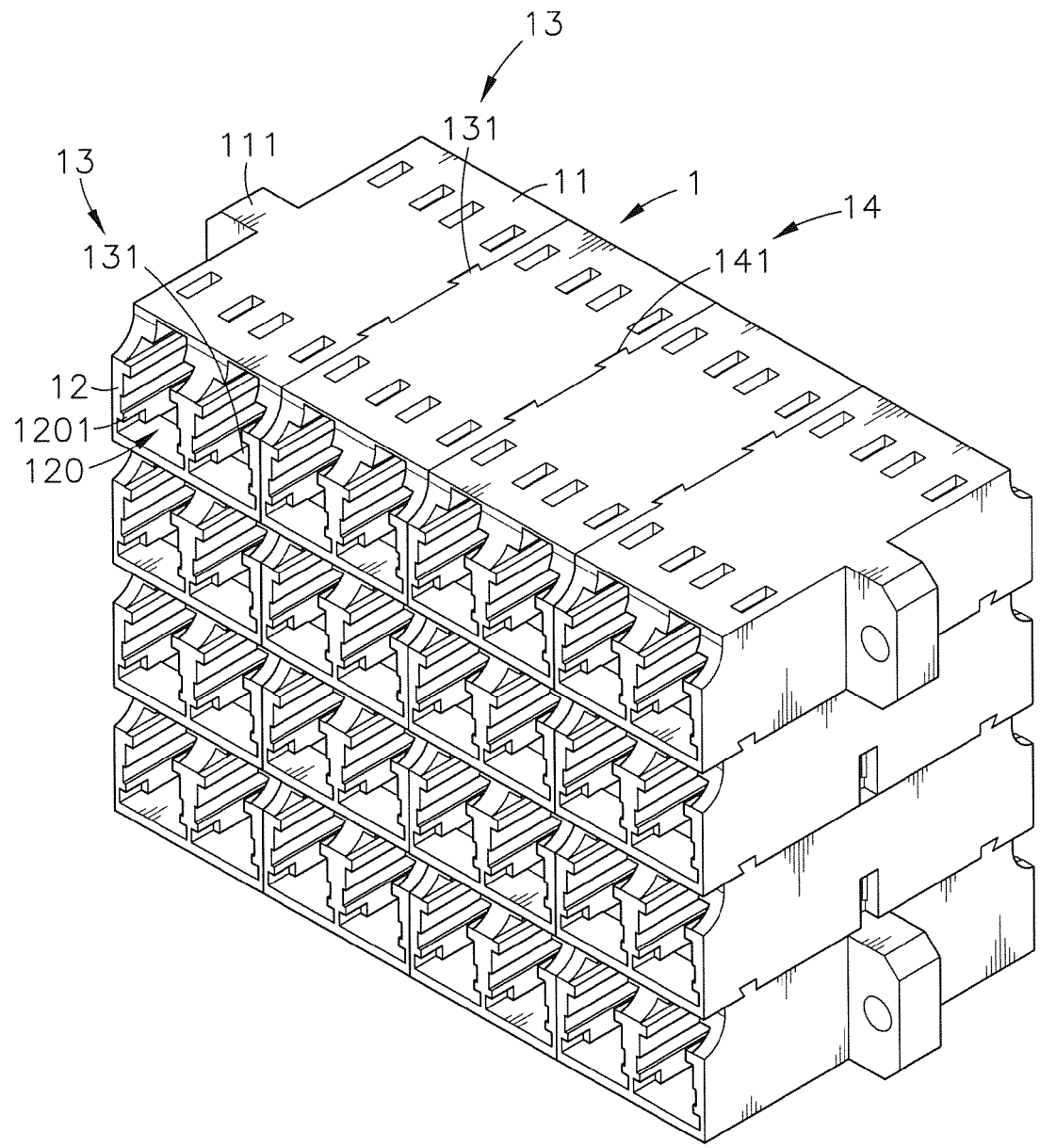
FIG. 9 is an elevational view of another preferred embodiment of the present disclosure after assembly.
Figure 10:
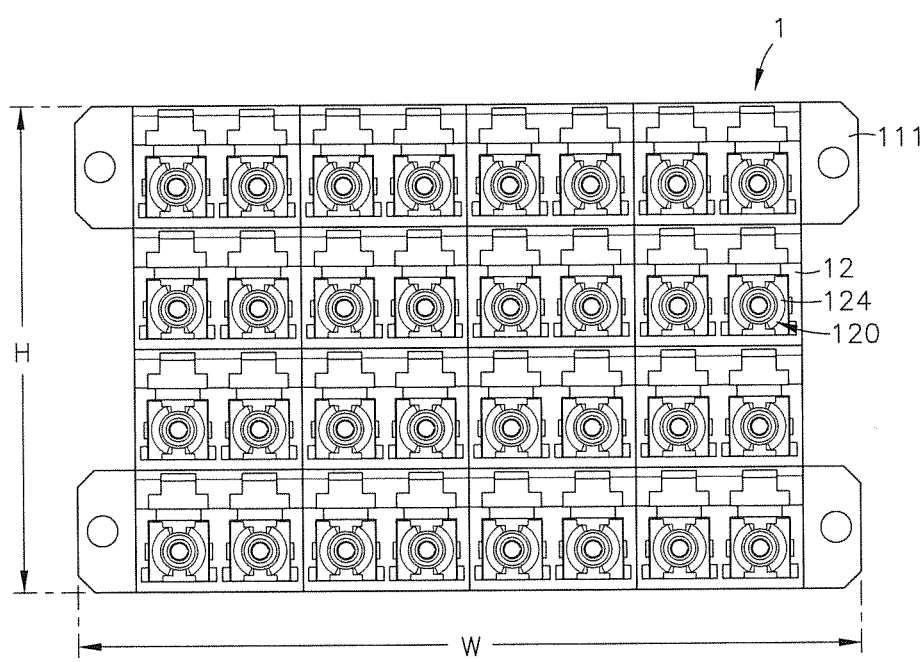
FIG. 10 is a front view of another preferred embodiment of the present disclosure after assembly.
Figure 11:
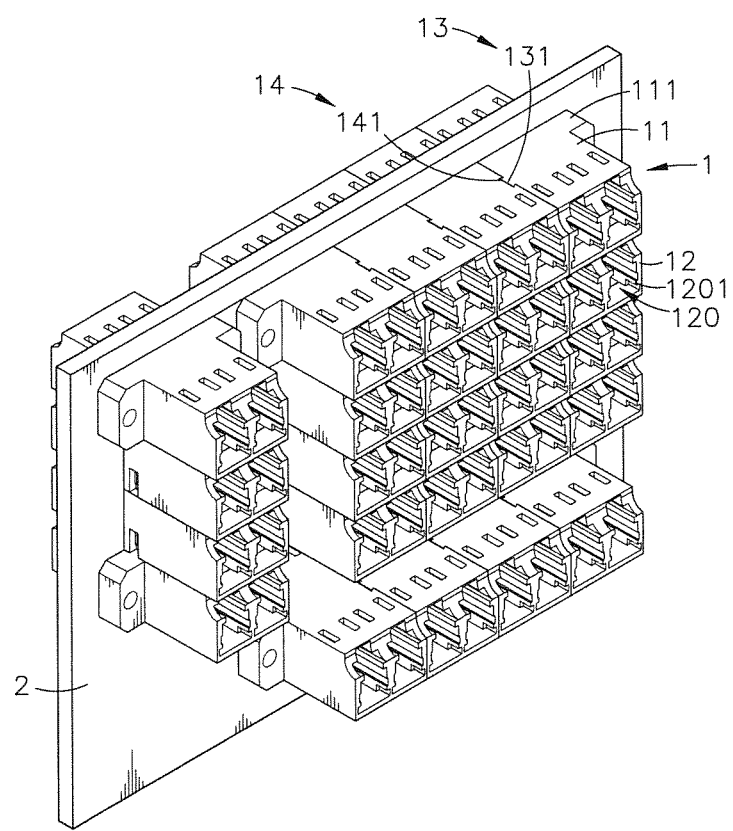
FIG. 11 is an elevational view of alternative preferred embodiment of the present disclosure.
Figure 12:
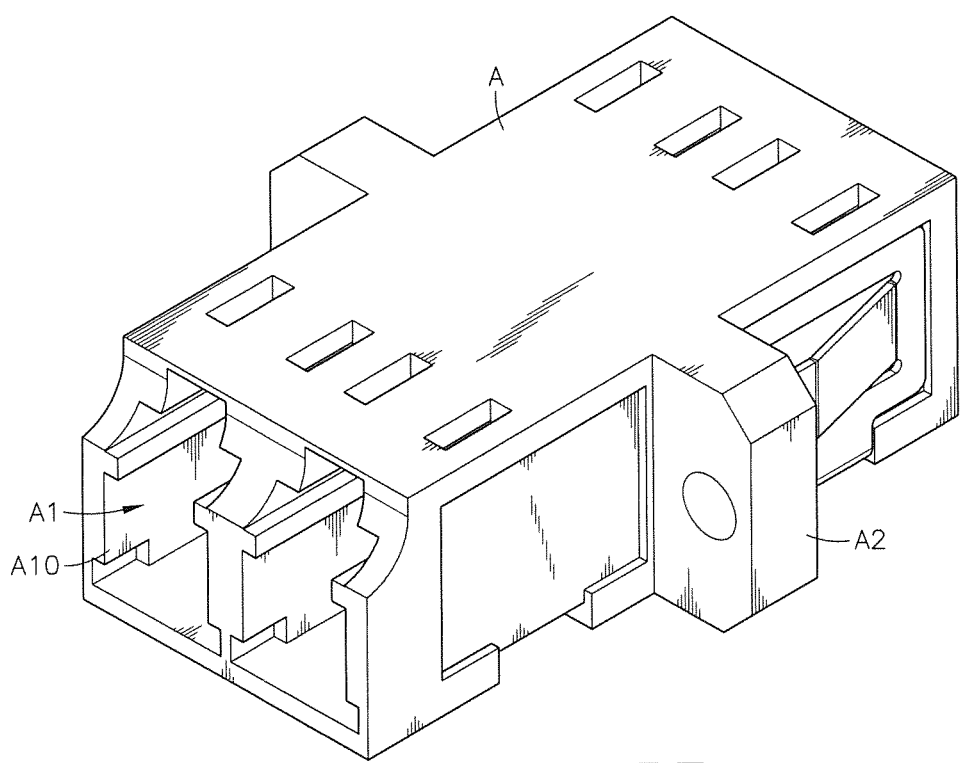
FIG. 12 is an elevational view of a traditional optical fiber adapter.

Please refer to FIG. 6 and FIG. 7 which respectively show an exploded view of other preferred embodiment of the present disclosure before assembly and an elevational view after assembly. As shown in FIGs clearly, a preferred embodiment of the present disclosure includes four shell members 1 assembled in parallel in order from left to right, and a plurality of positioning parts 13 and wedged-jointing parts 14 are vertically disposed at lateral sides of the two adjacent bases 11 and near two sides of the central compartment wall 121 of the mating part 12, and the wing plates 111 are respectively protruded at two opposite outer sides of the bases 11 of the first and fourth shell members 1. According to actual application, the plurality of positioning parts 13 and the plurality of wedged-jointing parts 14 corresponding thereto can be vertically disposed on left and right walls of the base 11 and adjacent to the compartment wall between the two mating parts 12 respectively; alternatively, the plurality of positioning parts 13 and the plurality of wedged-jointing parts 14 corresponding thereto can be disposed on the left wall or right wall of the base 11 and adjacent to the front and rear mating parts 12 of the compartment walls 121 between the mating parts 12.

During assembly of this preferred embodiment of the present disclosure, a positioning part 13 of one shell member 1 is aligned with a wedged-jointing part 14 of other shell member 1 first, and the two bases 11 are pushed towards each other along a Z axis to mount the clasping block 131 into other position-limiting groove 141. After the base 11 is inserted and fastened, an end surface of the clasping block 131 is stopped at the stop wall 1431 of other sliding slot 143 at bottom opening thereof, to facilitate the lateral side of two adjacent bases 11 to flush with each other. Alternatively, in actual application, the stop wall 1431 of sliding slot 143 can be omitted and the position-limiting groove 141 of the wedged-jointing part 14 is directly communicated with top and bottom sides of the base 11. By such way that the positioning part 13 of the shell member 1 is mounted with the wedged-jointing part 14 of other shell member 1 along the Z axis, the dovetail-shaped clasping block 131 of the positioning part 13 can be used to bear a force applied from X axis and Y axis, so as to stably fasten the two shell members 1 and prevent one shell member 1 from falling out of other shell member 1. By the manner of sequentially assembling the two adjacent base 11 to integrally form a horizontal modularized stack structure, lateral sides of the two adjacent bases 11 which do not have the protruding wing plates 111 can be tightly abutted with each other, so the number of the shell members 1 able to be installed in a predetermined width range becomes more and the density of installed shell members 1 become higher.

Please refer to FIG. 8 through FIG. 11 which respectively show an exploded view of another preferred embodiment of the present disclosure before assembly, an elevational view and a front view after assembly, and an elevational view of alternative preferred embodiment of the present disclosure. As shown in FIGs clearly, apart from being respectively disposed on top and bottom opposite sides or left and right opposite sides of the two adjacent bases 11 of the plurality of shell members 1, the plurality of positioning parts 13 and wedged-jointing parts 14 can be vertically or transversely disposed on two adjacent lateral sides of the base 11 of the shell member 1 respectively upon actual application, to facilitate one set of four shell members 1 vertically stacked in parallel to be horizontally assembled with other set of four shell members 1 vertically stacked. The positioning parts 13 of the later set of the shell members 1 are aligned with the wedged-jointing parts 14 of the former set of the shell members 1, and the bases 11 of the two sets are pushed along the Z axis to move opposite to each other, so as to fasten the clasping blocks 131 of the later set into the position-limiting grooves 141 of the former set. After the bases 11 are fastened, the shell member 1 at the bottom of the later set is abutted with the stop wall 1431 of the sliding slot 143 of the shell member 1 at the top of the former set by the surface of the clasping block 131 thereof, to make the bases 11 of two adjacent sets stacked in parallel flush with each other. By the manner that the positioning parts 13 of the shell members 1 of the later set are mounted with the wedged-jointing parts 14 of the shell members 1 of the former set along the Z axis, the dovetail-shaped clasping blocks 131 of the positioning part 13 can bear the force from X axis and Y axis for stably fastening the shell members 1 and avoiding one shell member 1 from falling out of other shell member 1. Therefore, by above-mentioned manner, the two adjacent sets of the stacked bases 11 can be sequentially assembled to integrally form as a horizontal modularized array structure.

The stackable optical fiber adapter of the present disclosure can be applied to data center or optical communication system, or utilized in storage equipment, computer peripheral equipment or other information equipment operating in high-speed and having a large volume of storage in a network system. The plurality of shell members 1 which are vertically stacked, horizontally arranged in parallel or assembled in array can be further installed on a rack-mount panel 2 of an optical fiber connection box, digital matrix board, a fiber optic distribution box or other optical fiber equipment by using the wing plates 111 of the bases 11 or the wing plates 111 in cooperation with a metal clip, and a plurality of optical fiber connectors (not shown in FIGs) can be inserted into the accommodating cavities 120 through the sockets 1201 of the mating parts 12 of the shell members 1, so that the optical fiber cores of two optical fiber connectors can be respectively inserted into the insertion channel 1221 of the mounting part 122 and the fastening channel 1241 of the fastening part 124, and easily aligned to be connected with each other under guiding and constraining of the pipe 123, for optical signal transmission. The plurality of shell members 1 assembled already can be installed on the panel 2 and constrained in directions of X, Y and Z axes to bear forces from XYZ axes. According to a result of a pull test, it is obtained that the assembled optical fiber adapters of the present disclosure can bear 3.4 kg of lateral pull force and 6.8 kg of axial pull force, or higher pull force. Therefore, during the process of the optical fiber connector being inserted into or pulled from the shell member 1, the shell member 1 is hard to be forced out of its position or broken in structure, and stability of entire structure of the assembled optical fiber adapters can be ensured.

Figure 13:
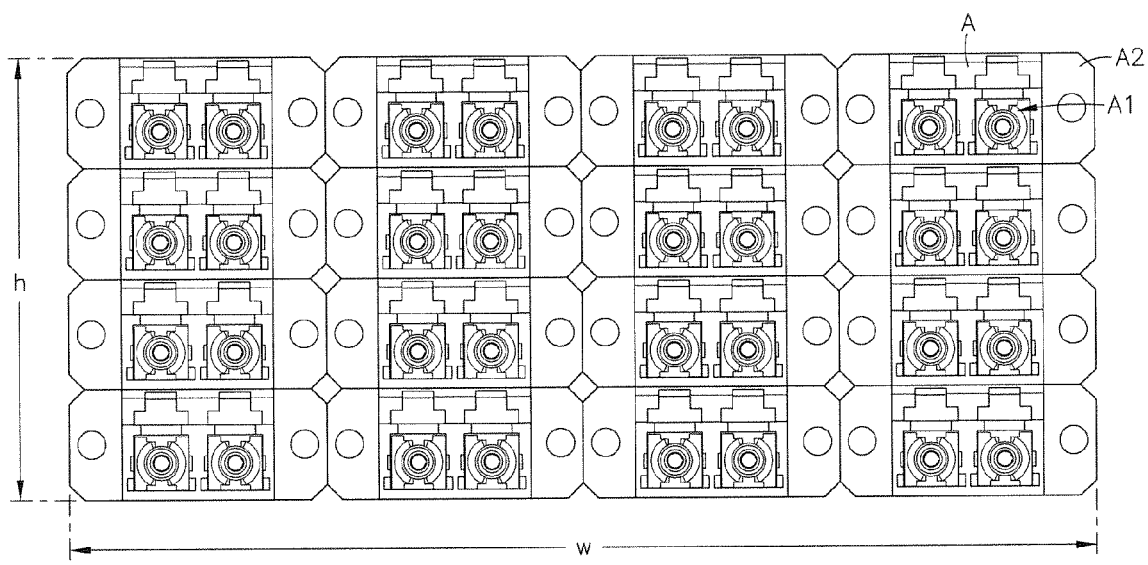
FIG. 13 is a using state view of the traditional optical fiber adapter.
Figure 14:
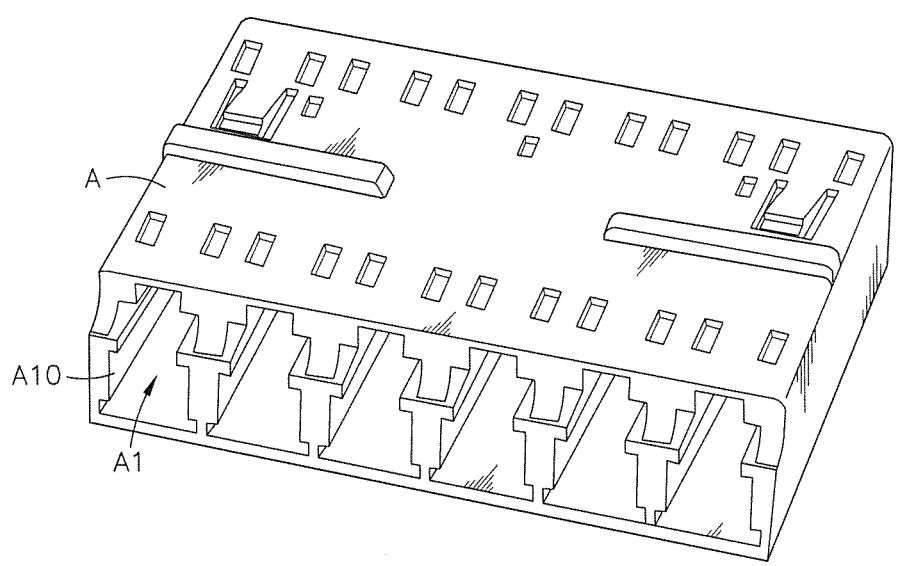
FIG. 14 is an elevational view of other traditional optical fiber adapter.

However, the content above described is just a preferred embodiment of the present disclosure, and the scope of the present disclosure is not limited thereto. By using the dovetail-shaped positioning parts 13 in cooperation with the wedged-jointing parts 14, the lateral sides of two adjacent bases 11 of the shell members 1 are fastened to integrally form an assembly in vertical stack, horizontal and parallel arrangement or array structure by a modularized manner. Upon actual application or requirement, the shell members 1 can be assembled free and number of the shell members 1 to be stacked can be varied. The assembled shell members 1 can further be installed on the panel 2. For example, when the plurality of shell members 1 of the present disclosure are assembled as a 4×4 array structure, the total height H and total width W of the array structure are 37.60 mm and 60.50 mm. Compared with a traditional optical fiber adapter (as shown in FIG. 13) having 37.60 mm of total height h and 87.20 mm of total width w, the plurality of shell members 1 of the present invention can be installed on the panel 2 with a given standard size in larger amount and higher density. The assembled structure of the positioning part 13 of the shell member 1 in cooperation with the wedged-jointing part 14 is simple and it is easy to design the mold. Additionally, each shell member 1 has a constant amount of the mating parts 12, so it is not necessary to develop different molds for various numbers of the mating parts 12 (such as six, eight, sixteen mating parts 12, and so on). Therefore, the present disclosure facilitates for modularization in mass production, and can simplify manufacturing process and number of the mold, whereby the effects of stable structure, easy assembly, easy mass production and low cost can be achieved.

The above-mentioned descriptions represent merely exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What the invention claimed is:

1. A stackable optical fiber adapter, comprising:
a plurality of shell members, and bases of the plurality of shell members defining a plurality of mating parts formed at front and rear opposite sides thereof, and each two opposite mating parts having an accommodating cavity transversely communicated therethrough to insert with predetermined optical fiber connectors, and
at least one positioning part and a wedged-jointing part on each lateral side of adjacent bases of adjacent shell members,
said positioning part and said wedged-jointing part respectively having a dovetail-shaped clasping block and a position-limiting groove which can be mounted and fastened with each other to make the plurality of shell members be modularized as an integral structure,
said position-limiting groove of said wedged-jointing part defining a sliding slot with a step-like stop wall outwardly formed at a bottom opening of said sliding slot to abut with an end surface of a clasping block of a positioning part of an adjacent shell member positioned within said sliding slot and facilitate lateral sides of two adjacent bases to be flush with each other.

2. The stackable optical fiber adapter according to claim 1, wherein said shell member defines at least one protruding wing plate disposed at one side or two opposite sides of a center portion of said base thereof.

3. The stackable optical fiber adapter according to claim 1, wherein said shell member defines a compartment wall formed at a center portion of said accommodating cavity between each two mating parts, and said compartment wall defines a hollow mounting part transversely extended toward said accommodating cavity and having an insertion channel, and a pipe is fastened in said insertion channel, a fastening part is fastened in said accommodating cavity at other side of said compartment wall opposite to said mounting part, and a fastening channel is formed inside said fastening part to be inserted by an end of said pipe projected out of said compartment wall.

4. The stackable optical fiber adapter according to claim 1, wherein said base of said shell member defines a plurality of positioning parts and corresponding wedged-jointing parts transversely disposed at said accommodating cavities of top and bottom sides thereof and adjacent to said mating parts thereof, and said positioning parts of said shell member can be mounted and fastened with said wedged-jointing parts of other shell member to make said plurality of shell members be vertically stacked as an integral assembly by a modularized manner.

5. The stackable optical fiber adapter according to claim 1, wherein said base of said shell member defines a plurality of positioning parts and corresponding wedged-jointing parts vertically disposed respectively at left and right sides thereof and near said center portion thereof, said positioning parts of said shell member and said wedged-jointing parts of other shell member can be mounted with each other to make the plurality of shell members be horizontally arranged in parallel to form as an integral assembly by a modularized manner.

6. The stackable optical fiber adapter according to claim 1, wherein said base of said shell member defines a plurality of positioning parts and corresponding wedged-jointing parts vertically or transversely disposed respectively at each two adjacent lateral sides thereof, and said positioning parts of said shell member and said wedged-jointing parts of said other shell member can be mounted with each other to make the plurality of shell members be assembled as an integral array structure by a modularized manner.

7. An optical fiber adapter, comprising:
a shell member with a base, said base comprising:
   a plurality of mating parts formed at front and rear opposite sides of said base, each two opposite mating parts having an accommodating cavity transversely communicated therethrough to insert with predetermined optical fiber connectors; and
   at least one positioning part with a dovetail-shaped clasping block protruding from said base and at least one wedged-jointing part with a position-limiting groove recessed in said base, said position-limiting groove defined for another dovetail-shaped clasping block of an adjacent shell member to slide therewithin;
wherein said position-limiting groove comprises a sliding slot with a step-like stop wall outwardly formed at a bottom opening of said sliding slot to abut with an end surface of another dovetail-shaped clasping block of the adjacent shell member positioned within said sliding slot and facilitate lateral sides of two adjacent bases to be flush with each other.

8. The optical fiber adapter according to claim 7, wherein said shell member defines at least one protruding wing plate disposed at one side or two opposite sides of a center portion of said base thereof.

9. The optical fiber adapter according to claim 7, wherein said shell member defines a compartment wall formed at a center portion of said accommodating cavity between each two mating parts, and said compartment wall defines a hollow mounting part transversely extended toward said accommodating cavity and having an insertion channel.

10. The optical fiber adapter according to claim 9, furthering comprising:
   a pipe fastened in said insertion channel;
   a fastening part fastened in said accommodating cavity at a side of said compartment wall opposite to said hollow mounting part; and
   a fastening channel formed inside said fastening part to be inserted by an end of said pipe projected out of said compartment wall.

* * * * *